United States Patent
Zeimis, III et al.

(10) Patent No.: US 9,302,600 B2
(45) Date of Patent: Apr. 5, 2016

(54) STOW-IN-FLOOR SEAT ASSEMBLY

(75) Inventors: Peter P. Zeimis, III, Shelby Township, MI (US); Carl J. Holdampf, Novi, MI (US)

(73) Assignee: Magna Seating Inc, Aurora, Ontario (CA)

( * ) Notice: Subject to any disclaimer, the term of this patent is extended or adjusted under 35 U.S.C. 154(b) by 18 days.

(21) Appl. No.: 14/127,349

(22) PCT Filed: Jun. 21, 2012

(86) PCT No.: PCT/CA2012/000613
§ 371 (c)(1),
(2), (4) Date: Jan. 15, 2014

(87) PCT Pub. No.: WO2012/174654
PCT Pub. Date: Dec. 27, 2012

(65) Prior Publication Data
US 2014/0117699 A1    May 1, 2014

Related U.S. Application Data

(60) Provisional application No. 61/500,172, filed on Jun. 23, 2011.

(51) Int. Cl.
*B60N 2/30* (2006.01)

(52) U.S. Cl.
CPC .............. *B60N 2/3097* (2013.01); *B60N 2/309* (2013.01); *B60N 2/3011* (2013.01); *B60N 2/3031* (2013.01); *B60N 2/3065* (2013.01); *B60N 2/3075* (2013.01); *B60N 2/3079* (2013.01)

(58) Field of Classification Search
CPC ....................................................... B60N 2/3075
USPC .................... 297/378.1, 316, 331, 15, 334
See application file for complete search history.

(56) References Cited

U.S. PATENT DOCUMENTS

| | | | |
|---|---|---|---|
| 4,105,245 | A | 8/1978 | Simons et al. |
| 6,382,491 | B1 | 5/2002 | Hauser et al. |
| 7,134,725 | B2 | 11/2006 | Hofmann et al. |
| 7,255,384 | B2 | 8/2007 | Saberan et al. |
| 7,290,822 | B2 | 11/2007 | Villeminey |
| 7,850,220 | B2 | 12/2010 | Holdampf |
| 7,950,713 | B2 | 5/2011 | Grudl et al. |

(Continued)

FOREIGN PATENT DOCUMENTS

| | | |
|---|---|---|
| WO | 2006130975 | 12/2006 |
| WO | 2010125677 | 11/2010 |

*Primary Examiner* — David R Dunn
*Assistant Examiner* — Timothy J Brindley
(74) *Attorney, Agent, or Firm* — Miller Canfield

(57) ABSTRACT

A seat assembly comprises a seat cushion and a seat back pivotally coupled to the seat cushion for pivotal movement between an upright seating position and a fold flat position overlying the seat cushion. A support bracket is coupled to the seat cushion for mounting the seat assembly to the floor of a vehicle. A pair of front legs extends between a first end pivotally coupled to the seat cushion and an opposite second end pivotally coupled to the support bracket. A pair of rear legs extends between a first end pivotally coupled to the seat cushion and an opposite second end pivotally coupled to the support bracket. A linkage mechanism is operatively coupled between the front legs and the rear legs for actuating rotation of the seat assembly between a seating position spaced above the vehicle floor and a stow position recessed within below the floor.

11 Claims, 15 Drawing Sheets

(56) References Cited

U.S. PATENT DOCUMENTS

| | | | |
|---|---|---|---|
| 8,066,326 B2* | 11/2011 | Hurst et al. | 297/321 |
| 8,556,323 B2* | 10/2013 | Hoge et al. | 296/65.13 |
| 2003/0001419 A1* | 1/2003 | Roth et al. | 297/378.1 |
| 2005/0077770 A1* | 4/2005 | Lang et al. | 297/331 |
| 2005/0116522 A1* | 6/2005 | Holdampf | 297/378.1 |
| 2008/0203772 A1* | 8/2008 | Holdampf | 297/15 |
| 2013/0341953 A1* | 12/2013 | White et al. | 296/65.01 |
| 2014/0001809 A1* | 1/2014 | Line et al. | 297/378.1 |
| 2014/0062158 A1* | 3/2014 | Line et al. | 297/378.1 |

\* cited by examiner

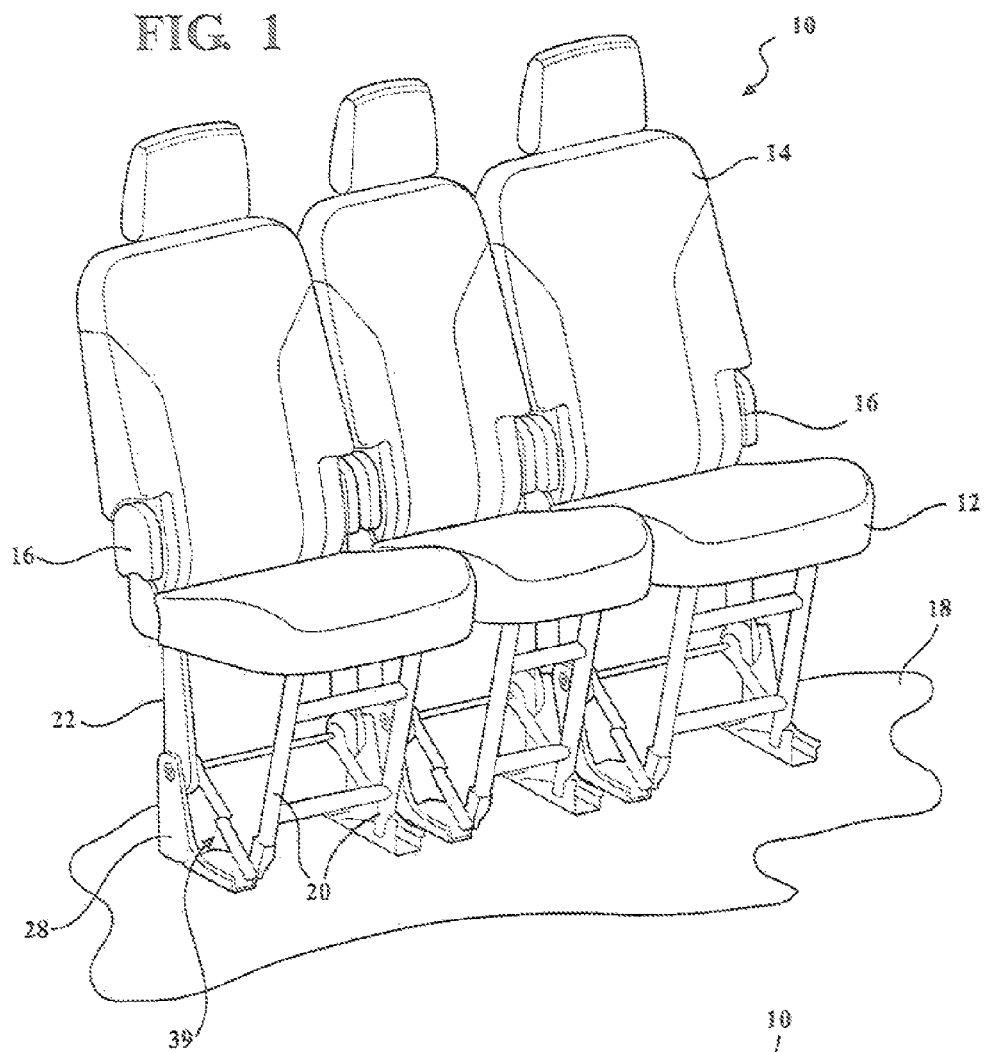
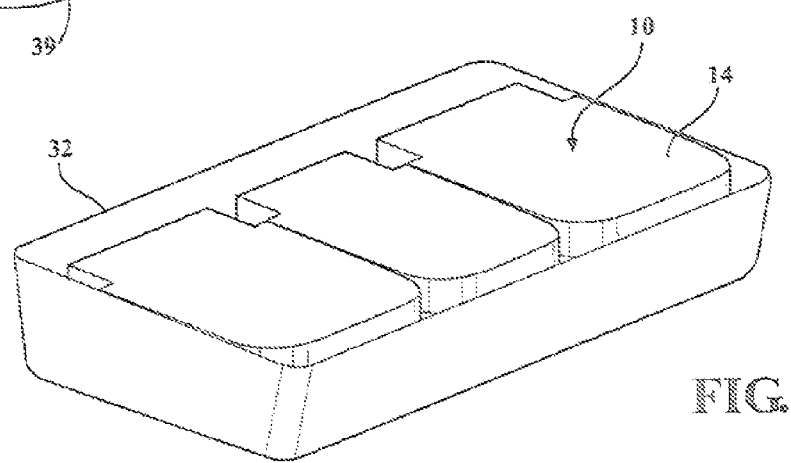

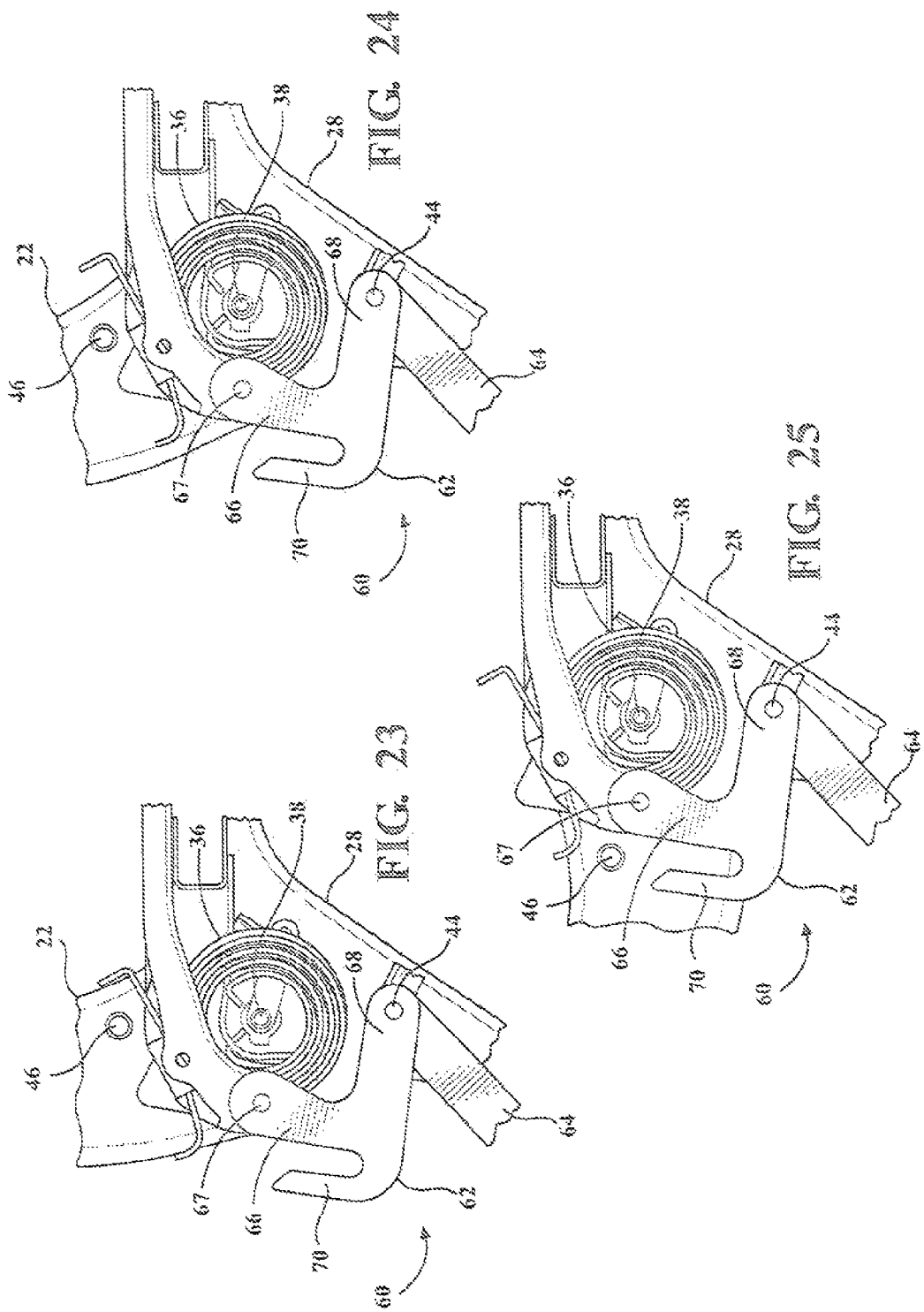

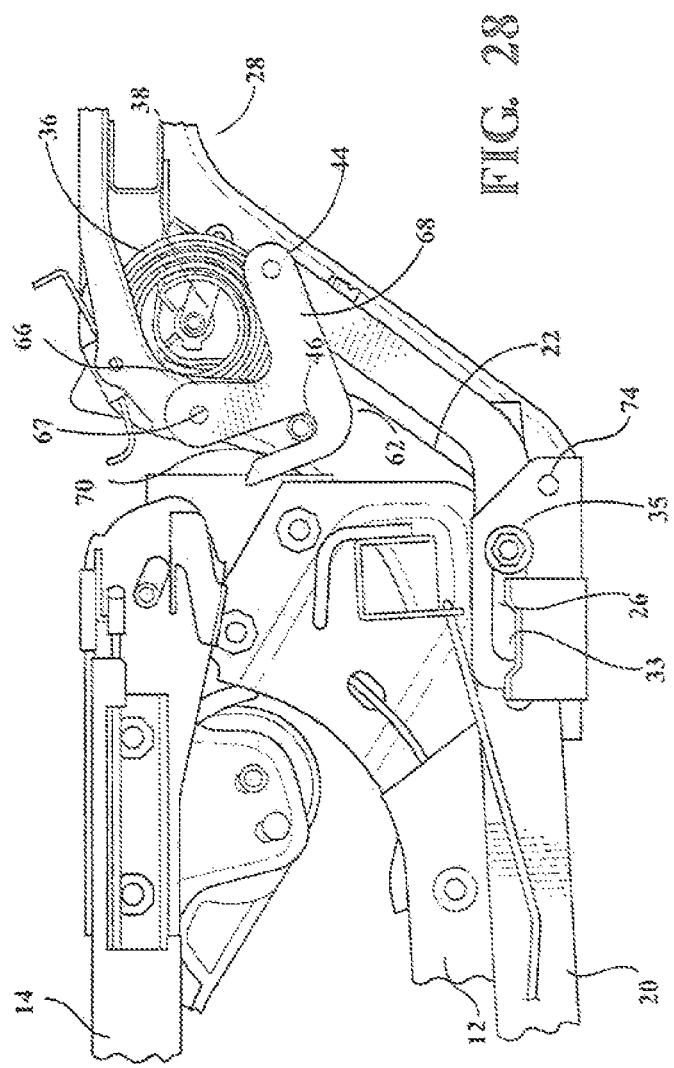

STOW-IN-FLOOR SEAT ASSEMBLY

RELATED APPLICATIONS

This application claims priority to and all the benefits of U.S. Provisional Application No. 61/500,172, filed Jun. 23, 2011 and entitled "Stow-in-Floor Seat Assembly".

BACKGROUND OF THE INVENTION

1. Field of the Invention

The invention relates to a seat assembly for an automotive vehicle, and more particularly, to a linkage mechanism for automatically displacing the seat assembly from an upright seating position to a stow position recessed within the floor of an automotive vehicle.

2. Description of Related Art

Automotive vehicles include seat assemblies for supporting occupants within the vehicle. The seat assemblies typically include a seat cushion and a seat back operatively coupled to the seat cushion by a recliner mechanism for allowing selective pivotal adjustment of the seat back relative to the seat cushion between a plurality of reclined seating positions. The seat back is also commonly moveable between any one of the reclined seating positions and a generally horizontal fold flat position overlying the seat cushion to present a load floor surface on the back of the seat back.

It is also known in the automotive seating art to mount a riser assembly between the seat cushion and the floor of the vehicle for moving the seat assembly between a seating position, with the seat back in one of the reclined seating positions and the seat cushion spaced above the floor, and a stow position, with the seat back in the fold flat position and the seat assembly stowed within a recess in the floor of the vehicle. The seat assembly typically includes a first release mechanism for actuating the recliner mechanism to provide pivotal movement of the seat back between the reclined seating positions and the fold flat position and a separate second release mechanism for actuating the riser assembly to provide pivotal movement of the seat assembly between the seating position and the stow position.

It remains desirable to provide a simple linkage mechanism operatively coupled between the riser assembly and the seat cushion for providing automatic movement of the seat assembly between the upright seating position and the stow position recessed within the floor of the vehicle.

SUMMARY OF THE INVENTION

According to one aspect of the invention, a seat assembly is provided to be mounted to the floor of an automotive vehicle for selective storage within a bin recessed in the floor. The seat assembly comprises a seat cushion extending between a forward portion and a rearward portion and a seat back pivotally coupled to the rearward portion of the seat cushion for pivotal movement between an upright seating position and a fold flat position overlying the seat cushion. A support bracket is coupled to the seat cushion and adapted for mounting the seat assembly to the floor of the vehicle. A pair of spaced apart front legs extends between a first end pivotally coupled to the forward portion of the seat cushion and an opposite second end pivotally coupled to the support bracket. A pair of spaced apart rear legs extends between a first end pivotally coupled to the rearward portion of the seat cushion and an opposite second end pivotally coupled to the support bracket. A linkage mechanism is operatively coupled between at least one of the front legs and one of the rear legs for actuating rotation of the seat assembly between a seating position spaced above the vehicle floor and a stow position recessed within the bin. The linkage mechanism includes a front control link having a first end pivotally coupled to the second end of the front leg and an opposite second end and a rear pull link having a first end pivotally coupled to one of the second end of the rear leg and the support bracket and a second end pivotally coupled to the second end of the front control link, wherein the rear leg engages the rear pull link upon rotation of the rear leg to control movement of the front control link thereby actuating the linkage mechanism between an extended position supporting the seat assembly in the seating position and a retracted position allowing the seat assembly to rotate to the stow position.

BRIEF DESCRIPTION OF THE DRAWINGS

Advantages of the present invention will be readily appreciated as the same becomes better understood by reference to the following detailed description when considered in connection with the accompanying drawings wherein:

FIG. 1 is front perspective view of a vehicle seat assembly according to one embodiment of the invention including a seat back operatively coupled to a seat cushion in a seating position;

FIG. 2 is a front perspective view of the seat assembly of FIG. 1 in a stow position recessed within a bin in the vehicle floor;

FIG. 23 is a fragmentary side view of the rear leg of the linkage mechanism of FIG. 20 with the seat assembly in the upright seating position;

FIG. 24 is a fragmentary side view of the rear leg of the linkage mechanism of FIG. 20 with the seat assembly moving to the easy entry position;

FIG. 25 is a fragmentary side view of the rear leg of the linkage mechanism of FIG. 20 with the seat assembly in the easy entry position;

FIG. 28 is a fragmentary side view of the linkage mechanism of FIG. 20 with the seat assembly in the stow position.

DETAILED DESCRIPTION OF THE EMBODIMENTS

Referring to the Figures, wherein like numerals indicate like or corresponding parts throughout the several views, a seat assembly according to one embodiment of the invention for use in an automotive vehicle is generally shown at 10. Referring to FIGS. 1 through 4, the seat assembly 10 includes a generally horizontal seat cushion 12 and a generally upright seat back 14 operatively coupled to the seat cushion 12 by a first recliner assembly 16. The seat cushion includes a seat cushion frame for supporting a cellular foam pad encased by a trim cover as is commonly known in the art. Similarly, the seat back 14 includes a seat back frame for supporting a cellular for pad encased by a trim cover. The recliner assembly 16 is selectively operable between a locked condition preventing pivotal movement of the seat back 14 and an unlocked condition allowing pivotal movement of the seat back 14 relative to the seat cushion 12 between an upright seating position (shown in FIG. 1, and in phantom in FIGS. 3 and 4), a plurality of reclined seating positions (not shown, but commonly known in the art), and a forwardly folded flat position overlying the seat cushion 12 (shown in FIG. 4). The first recliner assembly 16 may be any suitable recliner assembly that is well known in the art.

Figure 3:
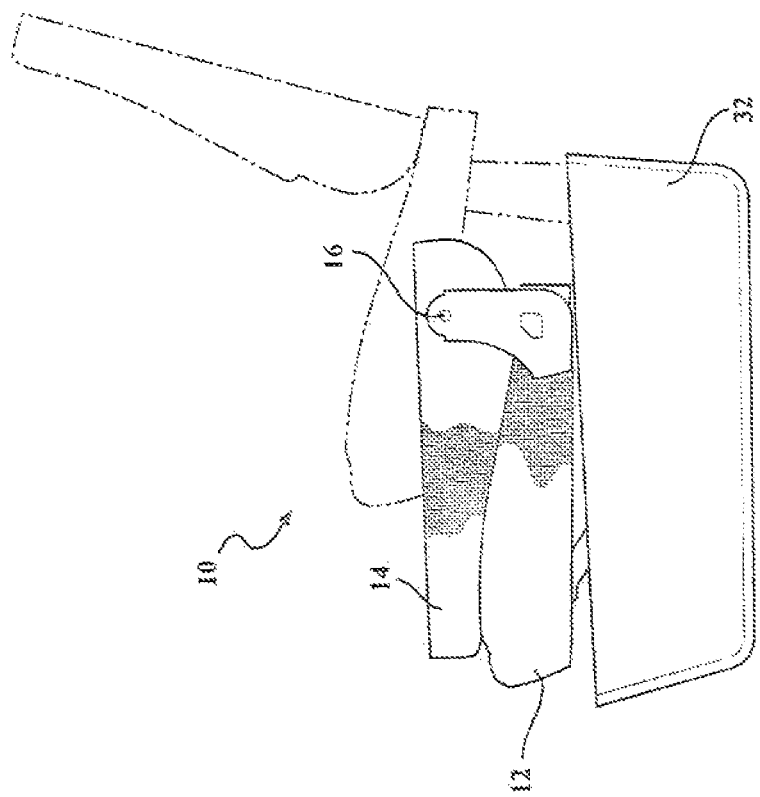
FIG. 3 is a side view of the seat assembly shown in an upright seating position and an easy entry position.
Figure 4:
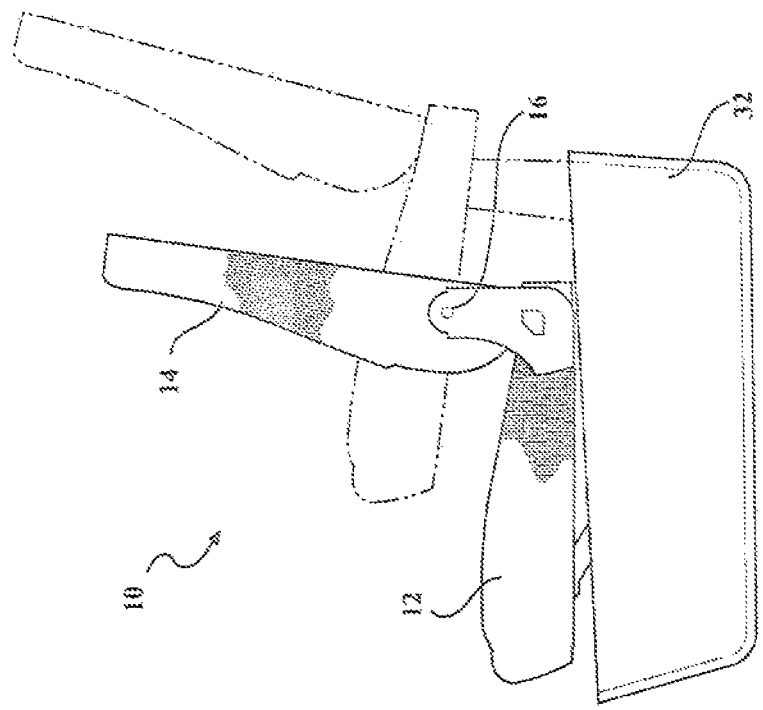
FIG. 4 is a side view of the seat assembly in the upright seating position and a fold flat position with the seat back overlying the seat cushion.
Figure 9:
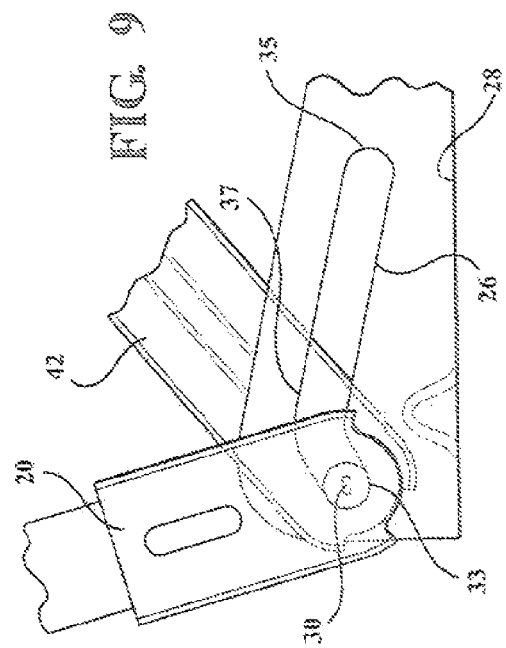
FIG. 9 is a fragmentary side view of the riser assembly and front leg of the linkage mechanism of the seat assembly of FIG. 1.
Figure 5:
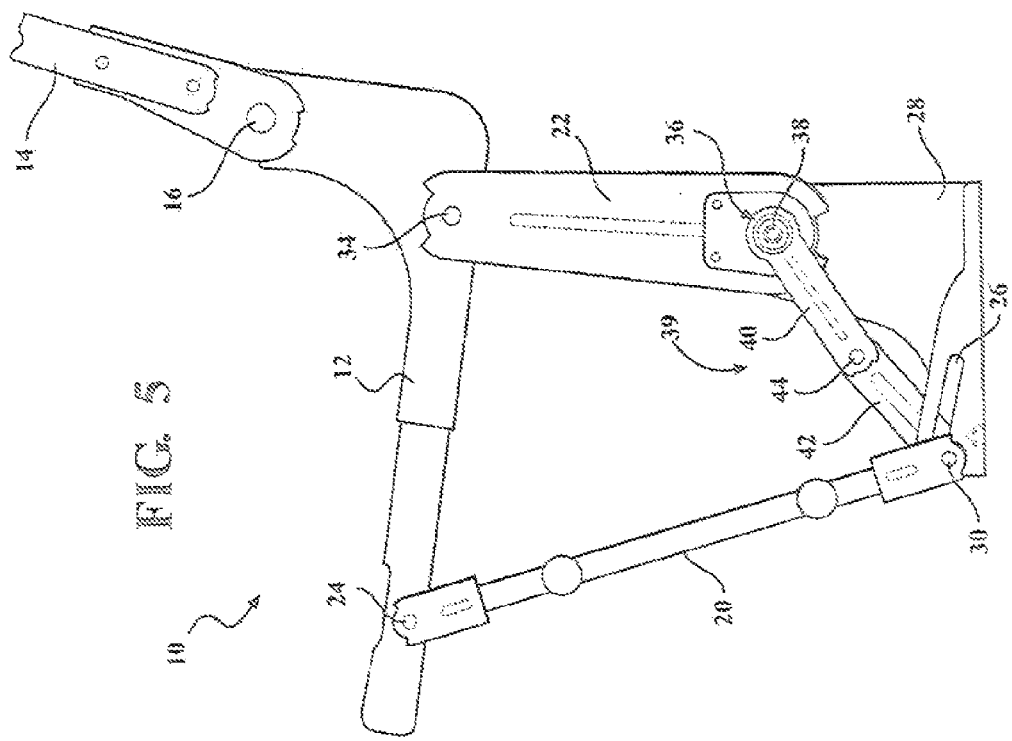
FIG. 5 is a side view of the linkage mechanism with the seat assembly in the upright seat position.
Figure 6:
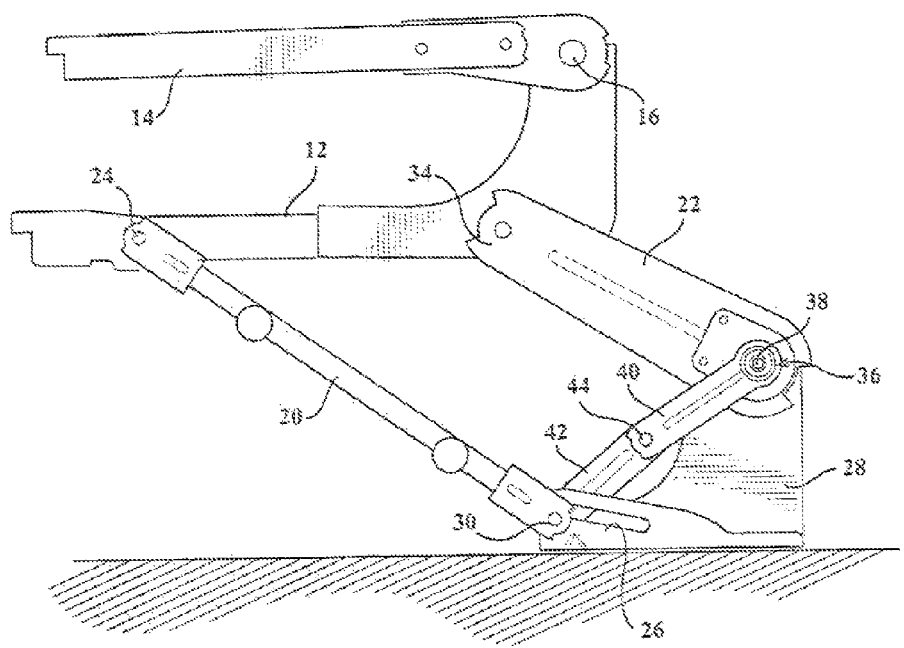
FIG. 6 is a side view of the linkage mechanism with the seat assembly in the fold flat and easy entry position.
Figure 7:
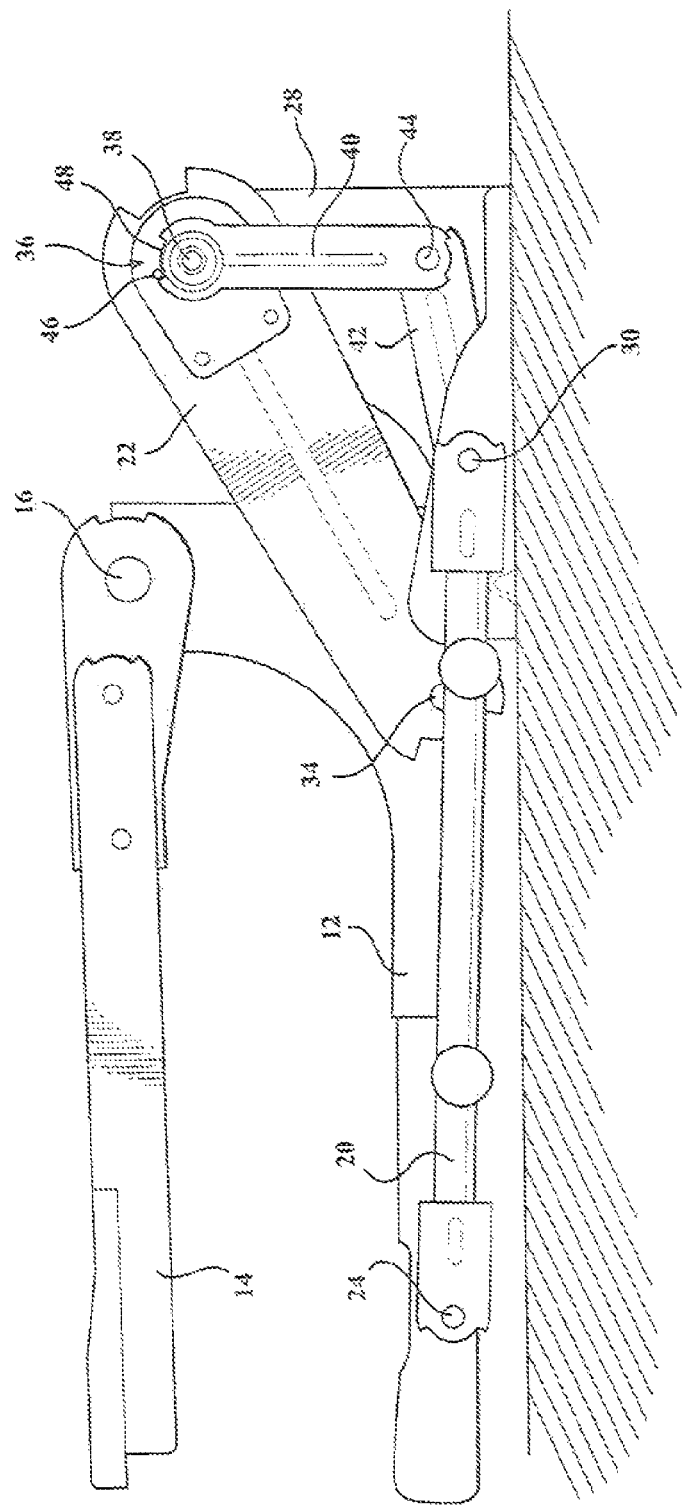
FIG. 7 is a side view of the linkage mechanism with the seat assembly in the stow position.

The seat assembly 10 is supported above a vehicle floor 18 by a pair of spaced apart front legs 20 and a pair of spaced apart rear legs 22 and is movable between a plurality of seating positions (shown in FIG. 1), an easy-entry position (shown in FIGS. 3 and 4), and a stow position (shown in FIGS. 2), as will be described below in more detail. Referring to FIGS. 5-7, the front legs 20 extend between an upper end pivotally coupled to a forward portion of the seat cushion 12 by a first pivot pin 24 and a lower end pivotally and slidably coupled to a slot 26 in a support bracket or riser 28 by a second pivot pin 30. The support bracket 28 is mounted in a recess or bin 32 that is recess in and located below the vehicle floor 18 and the slot 26 extends longitudinally between a first end 33 and a second end 35. Referring to FIG. 9, the slot 26 extends rearwardly and upwardly from the first end 33 to a peak 37 and then slopes rearwardly and downwardly from the peak 37 to the second end 35. The upward slope at the first end 33 of the slot 26 helps transfer seat loads to the support bracket 28 when the seat assembly 10 is in any of the plurality of seating positions.

Figure 8:
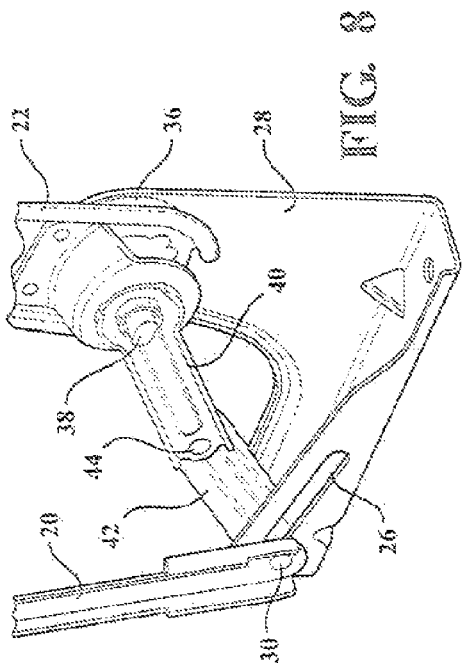
FIG. 8 is a fragmentary perspective view of the linkage mechanism of the seat assembly of Figure I in the upright seating position.

The rear legs 22 extend between an upper end pivotally coupled to a rearward portion of the seat cushion 12 by a third pivot pin 34 and a lower end operatively coupled to the support bracket 28 by a second recliner assembly 36 at a fourth pivot pin 38, as shown in FIG. 8. The second recliner assembly 36 is selectively operable between a locked state preventing movement of the seat assembly 10 and an unlocked state allowing movement of the seat assembly 10 between the plurality of seating positions, the easy-entry position, and the stow position. The second recliner assembly 36 may be any suitable seat back recliner assembly that is well known in the art. It is contemplated that the second recliner assembly 36 may include an inboard recliner and an outboard recliner with a connecting means extending therebetween to simultaneously actuate the inboard and outboard recliners between the locked and unlocked states. It is also contemplated that the second recliner assembly 36 could be located at the first pivot 24, the second pivot 30, the third pivot 34, or the fourth pivot 38 without varying from the scope of the invention. It is further contemplated that the inboard recliner and the outboard recliner could be located at different pivots.

Figure 10:
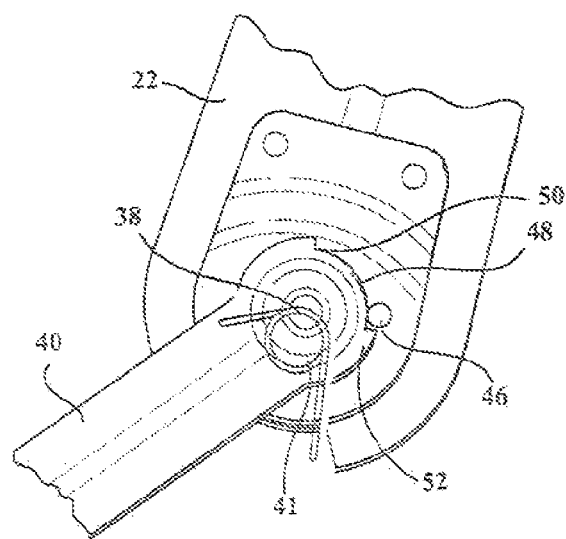
FIG. 10 is fragmentary side view of the rear leg of the linkage mechanism with the seat assembly in the upright seating position.
Figure 11:
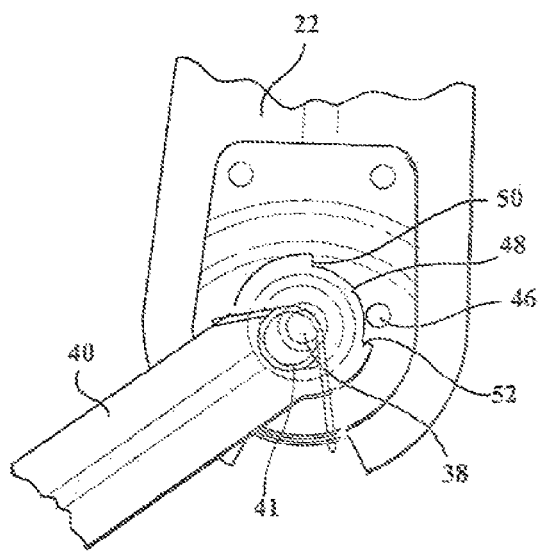
FIG. 11 is a fragmentary side view of the rear leg of the linkage mechanism with the seat assembly moving to the easy entry position.
Figure 12:
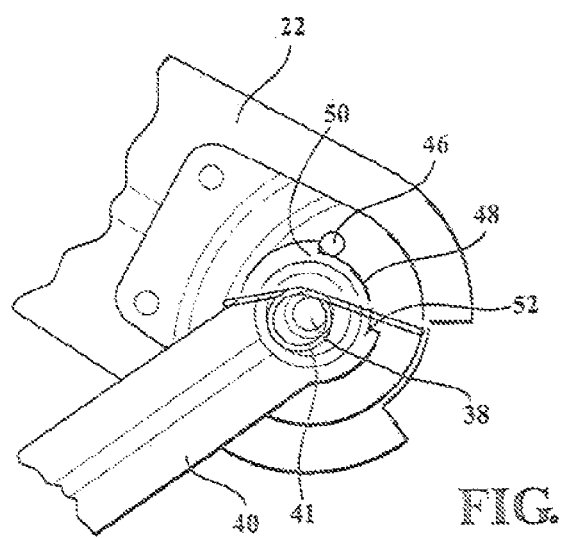
FIG. 12 is a fragmentary side view of the rear leg of the linkage mechanism with the seat assembly in the easy entry position.
Figure 13:
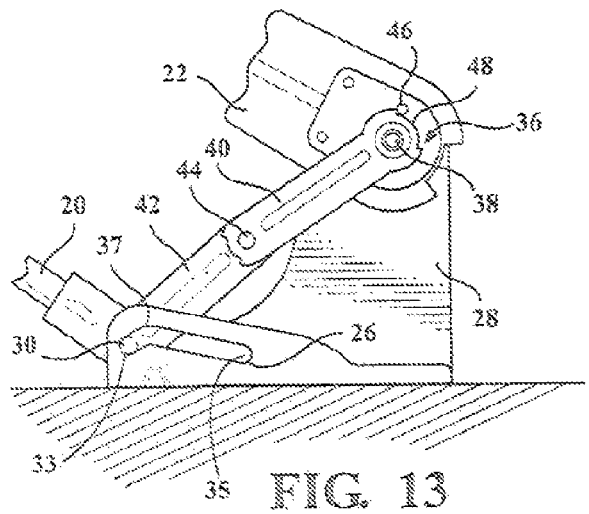
FIG. 13 is a fragmentary side view of the linkage mechanism with the seat assembly in the easy entry position.
Figure 14:
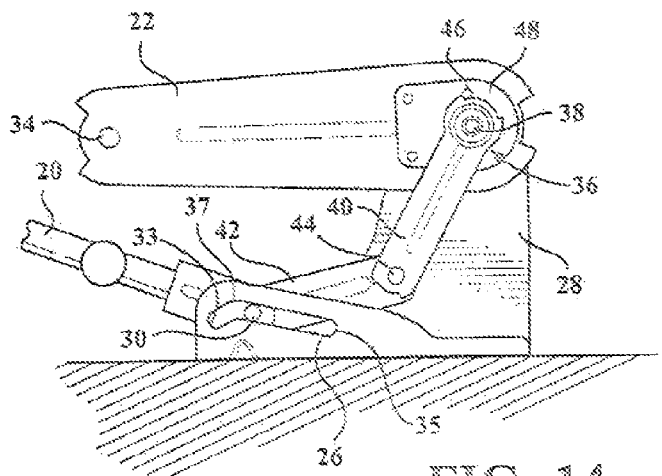
FIG. 14 is a fragmentary side view of the linkage mechanism with the seat assembly moving to the stow position.
Figure 15:
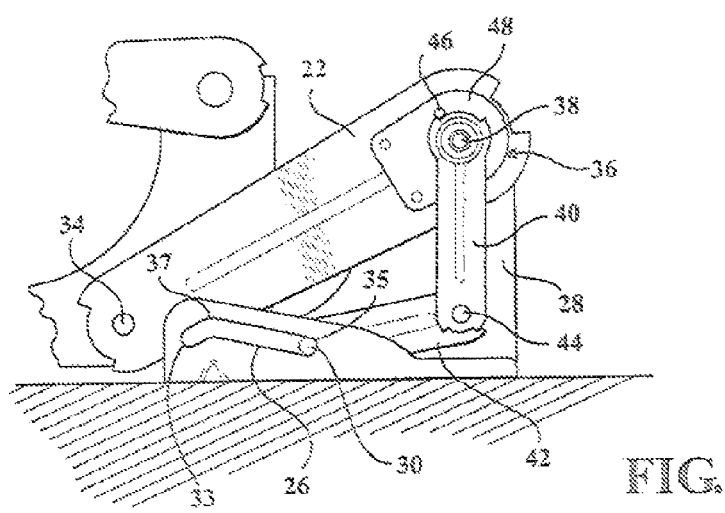
FIG. 15 is a fragmentary side view of the linkage mechanism with the seat assembly in the stow position.

A linkage mechanism 39 is operatively coupled between one of the front legs 20, one of the rear legs 22, and the corresponding support bracket 28 for actuation between an extended position and a retracted position to control movement of the seat assembly 10 between the easy-entry position and the stow position. More specifically, the linkage mechanism 39 includes a rear pull link 40 and a front control link 42. The rear pull link 40 extends between a first end pivotally coupled to the lower end of the rear leg 22 at the fourth pivot pin 38 and an opposite second end. The rear pull link 40 is biased about the fourth pivot pin 38 in a clockwise direction (when viewed from the Figures) by a coil spring 41 wound about the pivot pin 38 and having a first end connected to the rear leg 22 and an opposite second end connected to the rear pull link 40, as shown in FIG. 10-12. The front control link 42 extends between a first end pivotally coupled to the lower end of the front leg 20 at the second pivot pin 30 and a second end pivotally coupled to the second end of the rear pull link 40 by a fifth pivot pin 44. When the seat assembly 10 is in one of the plurality of seating positions the linkage mechanism 39 is in an over-center condition such that the fifth pivot pin 44 is disposed toward the front leg 20 and the second pivot pin 30 is disposed at the first end 33 of the slot 26, as shown in FIGS. 5, 8, and 9. Similarly, when the seat assembly 10 is in the easy-entry position, the linkage mechanism 39 is still in the over-center condition and the second pivot 30 is disposed at the first end 33 of the slot 26, as shown in FIG. 6. However, when the seat assembly 10 is in the stow position, the linkage mechanism 39 is in a folded condition and the second pivot 30 is disposed at the second end 35 of the slot 26, as shown in FIG. 7. In the embodiment shown, the slot 26 is arranged such that the fifth pivot 44 is higher than the second pivot 30 when the seat assembly 10 is in the stow position, as shown in FIG. 15.

Referring to FIGS. 10-15, a stow pin 46 is fixedly secured to the lower end of the second leg 22 and actuates the linkage mechanism 39 between the over-center condition and the folded condition. In operation, the seat assembly 10 is selectively movable between the plurality of seating positions by actuating the second recliner assembly 36 to the unlocked state to allow the front and rear legs 20, 22 to pivot forwardly or rearwardly. As the seat assembly 10 is moved between the plurality of seating positions, the stow pin 46 travels within a relief 48 at the first end of the rear pull link 40 such that the linkage mechanism 39 is not actuated and remains in the over-center condition. Thus, the second pivot 30 remains at the first end 33 of the slot 26. The relief 48 is an arcuate section formed in the periphery edge of the rear pull link 40 extending between opposite first and second ends 50, 52.

The seat assembly 10 is selectively movable between any one of the plurality of seating positions and the easy-entry position by actuating the second recliner assembly 36 to the unlocked state to allow the front and rear legs 20, 22 to pivot forwardly or rearwardly. As the seat assembly 10 is moved from one of the plurality of seating positions toward the easy-entry position, the stow pin 46 travels within the relief 48 such that the linkage is not actuated and remains in the over-center condition. When the stow pin 46 abuts the first end 50 of the relief 48, the seat assembly 10 stops in the easy-entry position allowing entry and access behind the seat assembly 10. Additionally, the second pivot 30 remains at the first end 33 of the slot 26. The second recliner assembly 36 may be released to the locked state to lock and maintain the seat assembly 10 in the easy-entry position. Optionally, the first recliner assembly 16 may be actuated from the locked to unlocked state to allow the seat back 14 to pivot to the fold flat position overlying the seat cushion 12 as shown in FIGS. 4 and 6.

The seat assembly 10 is selectively movable between the easy-entry position and the stow position by actuating the second recliner assembly 36 to the unlocked state to allow the front and rear legs 20, 22 to pivot forwardly or rearwardly. As the seat assembly 10 is moved from the easy-entry position toward the stow position, the stow pin 46 pushes on the end 50 of the relief 48 causing the rear pull link 40 to rotate about the fourth pivot 38 in a counterclockwise direction (when viewed from the Figures) such that the linkage mechanism 39 is actuated from the over-center condition to the folded condition. Simultaneously, the second pivot 30 slides from the first end 33 to the second end 35 of the slot 26. When the second pivot 30 reaches the second end 35 of the slot 26 the seat assembly 10 is in the stow position disposed within the bin 32. It is appreciated that the seat assembly 10 may be moved from one of the plurality of seating positions to the stow position without stopping at the easy-entry position.

In order to return the seat assembly 10 from the stow position to seating position, the second recliner assembly 36 is again actuated from the locked to unlocked state and the seat cushion 12 or seat back 14 is lifted to cause the front legs 20 and rear legs 2 to pivot upwardly and rearwardly, or in the clockwise direction as shown, raising the seat assembly 10 out of the recess bin 32 to the raised seating position. The clockwise bias of the rear pull link 40 returns the linkage mechanism 39 to the over-center condition and the second pivot 30 to the first end 33 of the slot 26 as the seat assembly 10 is moved from the stow position to the easy-entry position and then to one of the plurality of seating positions.

Figure 16:
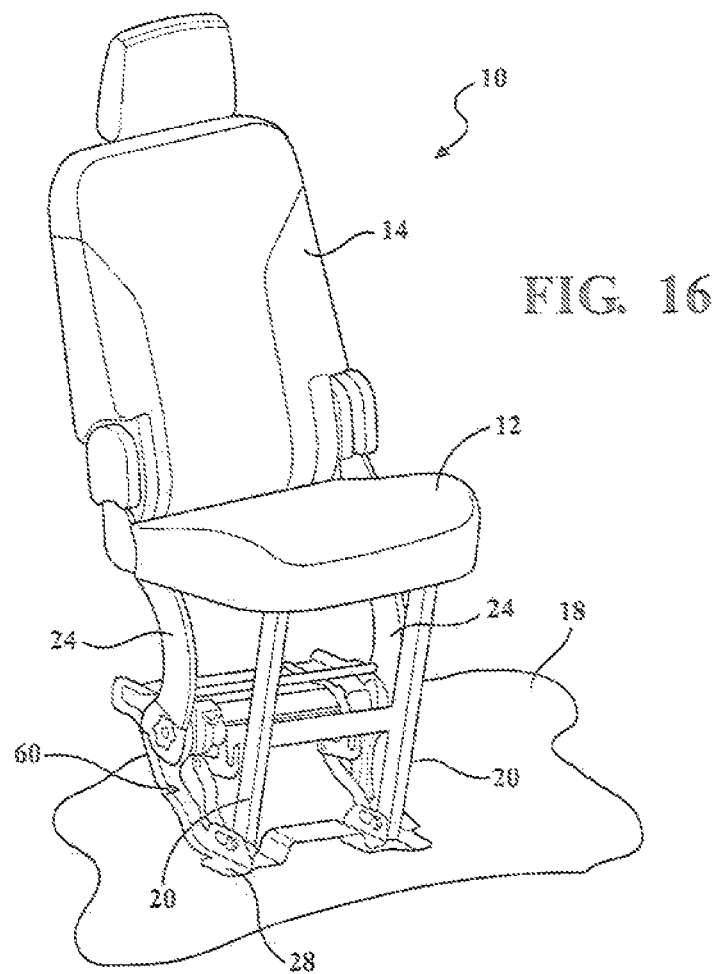
FIG. 16 is a front perspective view of a seat assembly according to an alternative embodiment of the invention.

Referring to FIGS. 16-28, an alternative embodiment of the seat assembly 10 is shown wherein like numerals indicate like or corresponding parts to the first embodiment and throughout the several views. The seat assembly 10 according to the alternative embodiment similarly includes a generally horizontal seat cushion 12 and a generally upright seat back 14 operatively coupled to the seat cushion 12 by a first recliner assembly 16. The recliner assembly 16 is selectively operable between a locked condition preventing pivotal movement of the seat back 14 and an unlocked condition allowing pivotal movement of the seat back 14 relative to the seat cushion 12 between an upright seating position (shown in FIG. 16), a plurality of reclined seating positions (not shown, but commonly known in the art), and a forwardly folded flat position overlying the seat cushion 12 (shown in FIG. 18).

Figure 19:
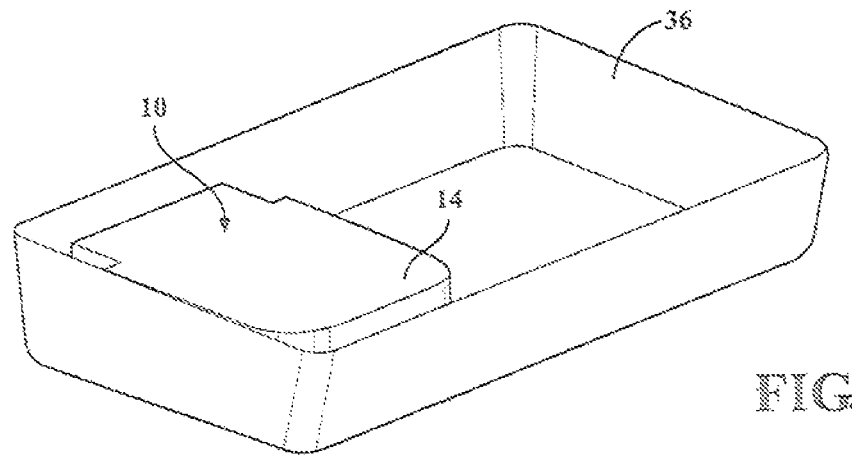
FIG. 19 is a front perspective view of the seat assembly of FIG. 16 in the stow position with the seat assembly recessed within a bin in the vehicle floor.
Figure 17:
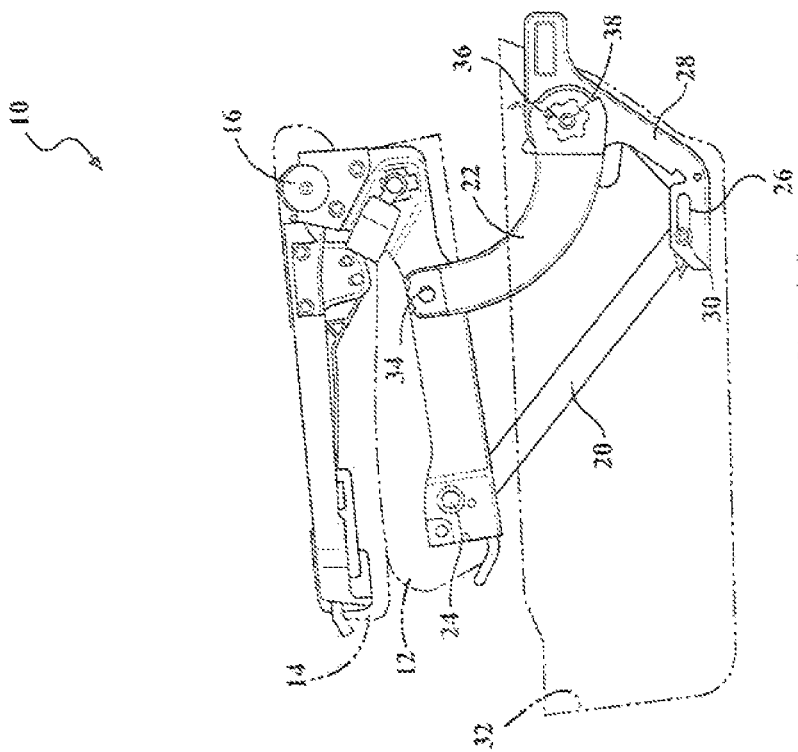
FIG. 17 is a side view of the seat assembly of FIG. 16 in an easy entry position.
Figure 20:
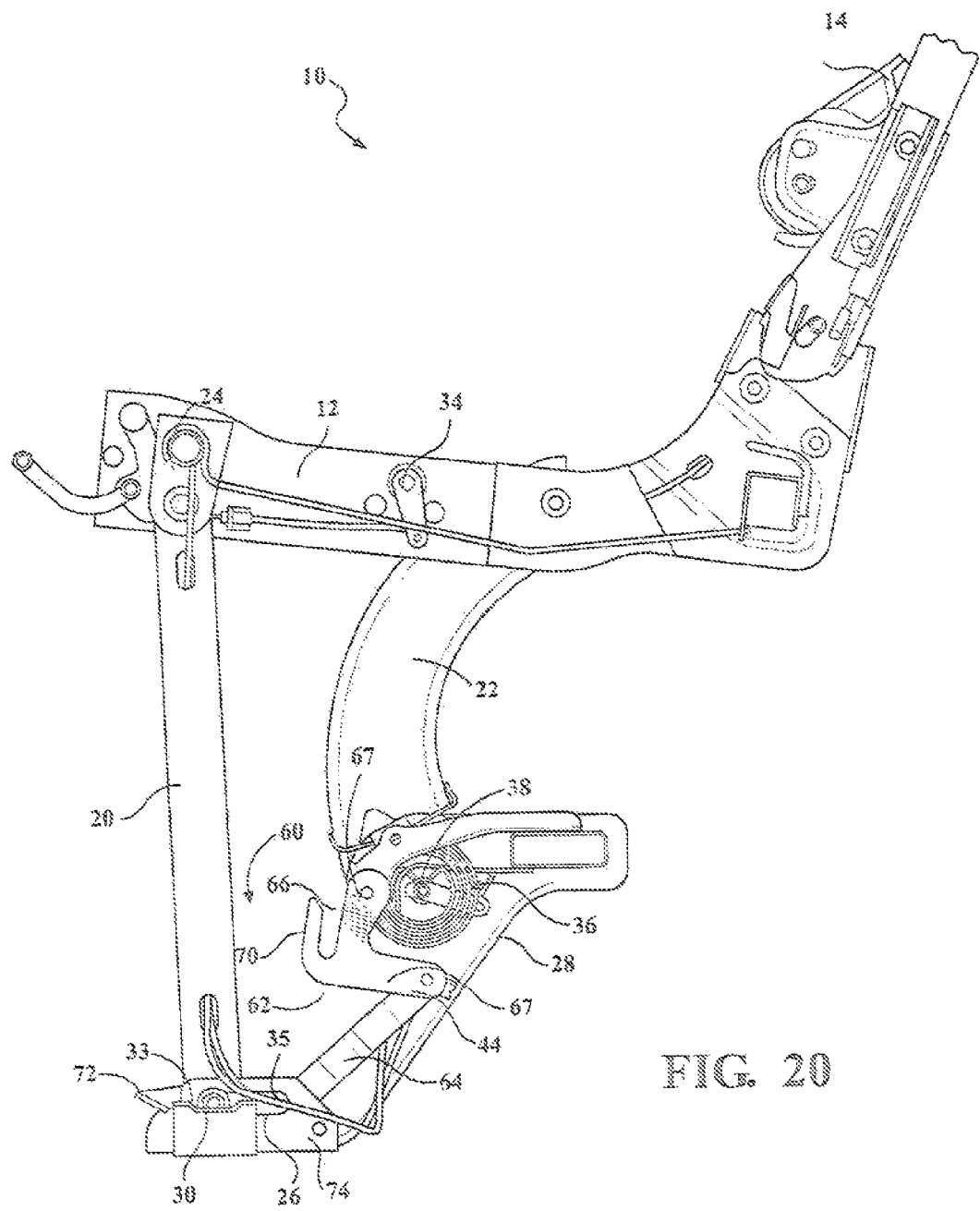
FIG. 20 is a fragmentary side view of the linkage mechanism according to the alternative embodiment with the seat assembly in the upright seating position.
Figure 21:
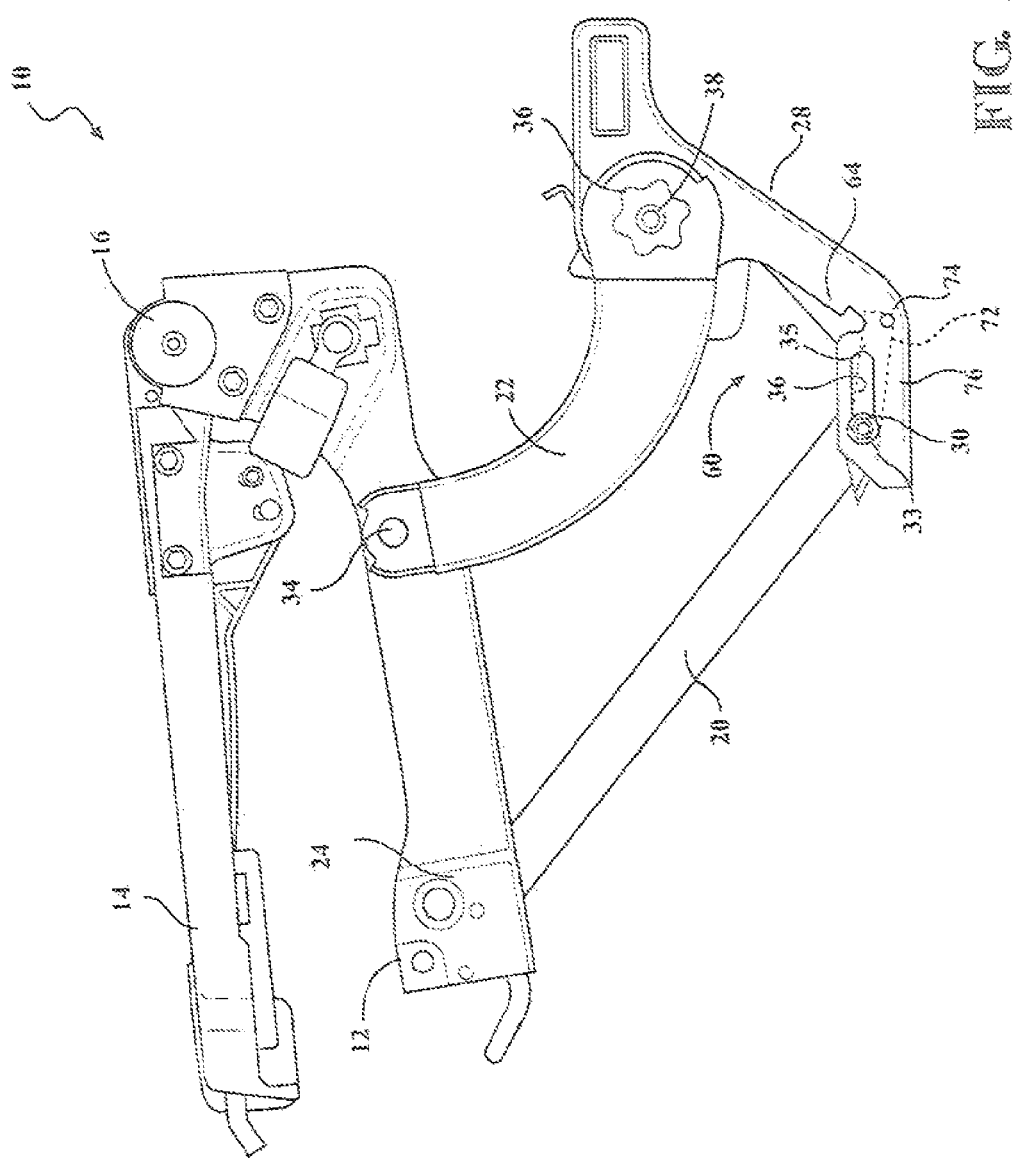
FIG. 21 is side view of the linkage mechanism of FIG. 20 with the seat assembly in the easy entry position.
Figure 22:
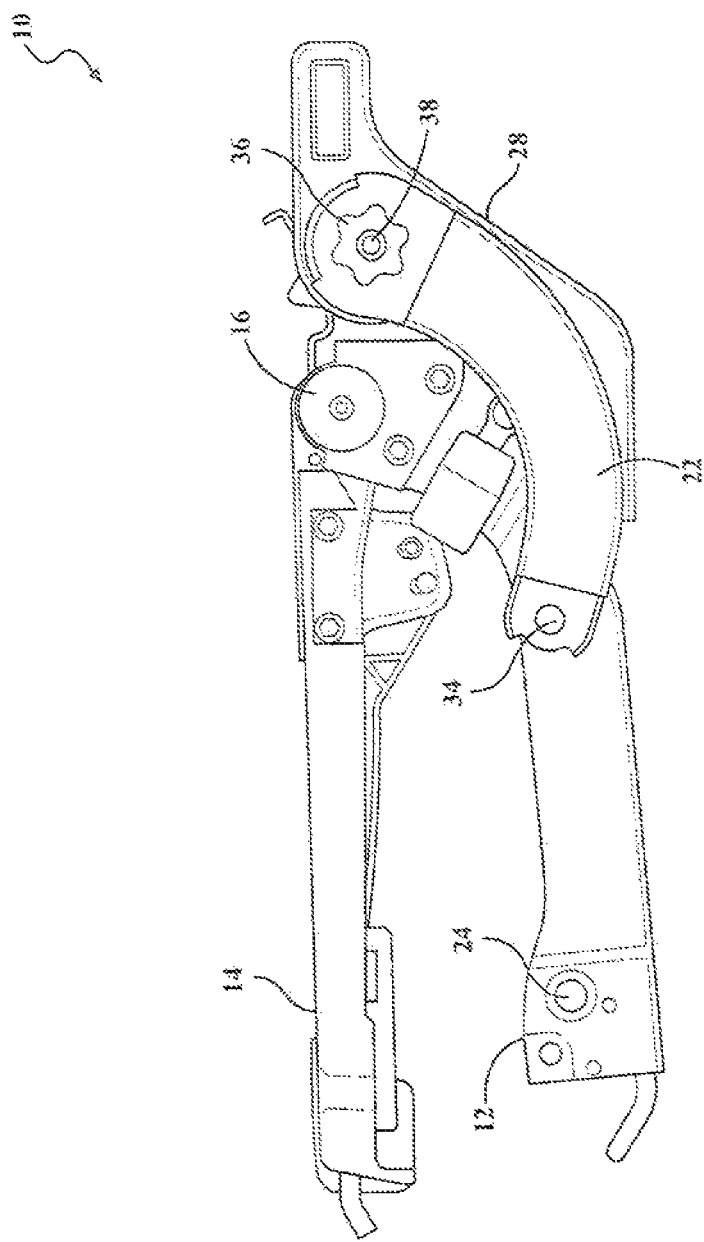
FIG. 22 is a side view of the linkage mechanism of FIG. 20 with the seat assembly in the stow position.
Figure 26:
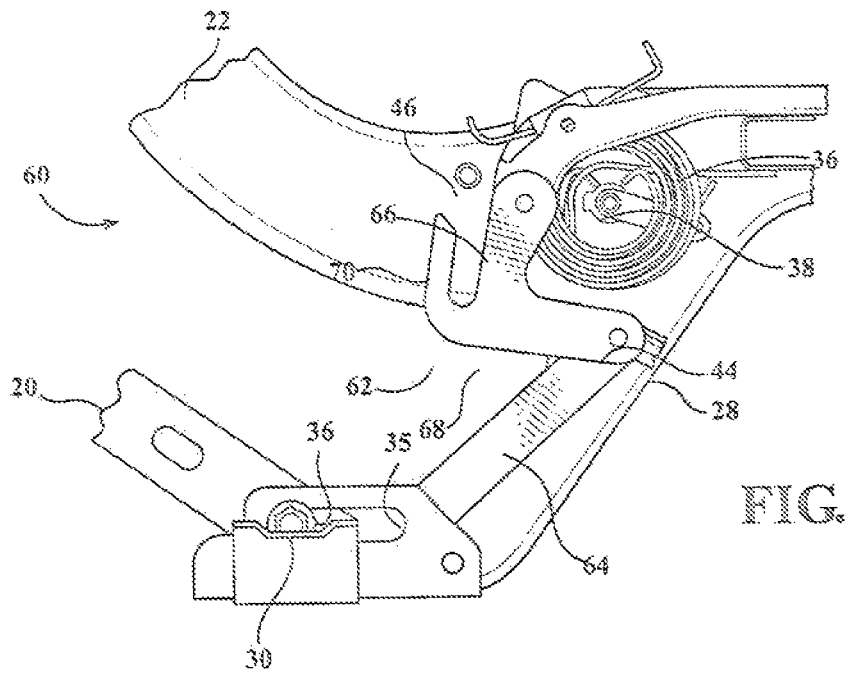
FIG. 26 is a fragmentary side view of the linkage mechanism of FIG. 20 with the seat assembly moving to the easy entry position.
Figure 27:
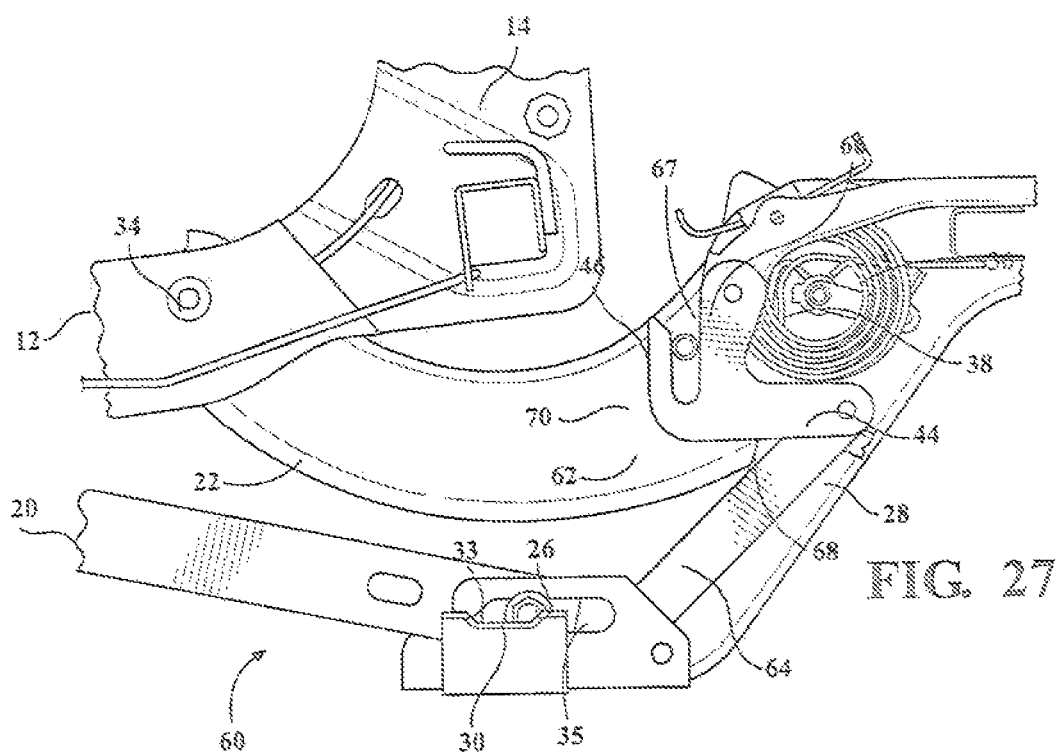
FIG. 27 is a fragmentary side view of the linkage mechanism of FIG. 20 with the seat assembly in the easy entry position.

The seat assembly 10 is supported above the vehicle floor 18 by a pair of spaced apart front legs 20 and a pair of spaced apart rear legs 22 and is movable between a plurality of seating positions (shown in FIG. 16), an easy-entry position (shown in FIG. 18), and a stow position (shown in FIGS. 19). Referring to FIGS. 20-22, the front legs 20 extend between an upper end pivotally coupled to a forward portion of the seat cushion 12 by a first pivot pin 24 and a lower end pivotally and slidably coupled to a slot 26 in a support bracket or riser 28 by a second pivot pin 30. The support bracket 28 is mounted along the bottom surface of a recess or bin 32 that is recess in and located below the vehicle floor 18 and the slot 26 extends longitudinally between a first end 33 and a second end 35.

The rear legs 22 extend arcuately between an upper end pivotally coupled to a rearward portion of the seat cushion 12 by a third pivot pin 34 and a lower end operatively coupled to the support bracket 28 by a second recliner assembly 36 at a fourth pivot pin. The second recliner assembly 36 is selectively operable between a locked state preventing movement of the seat assembly 10 and an unlocked state allowing movement of the seat assembly 10 between the plurality of seating positions, the easy-entry position, and the stow position.

A linkage mechanism 60 is operatively coupled between one of the front legs 20, one of the rear legs 22, and the corresponding support bracket 28 to control movement of the seat assembly 10 between the easy-entry position and the stow position. More specifically, the linkage mechanism 60 includes a rear pull link 62 and a front control link 64. The rear pull link 62 includes a first leg 66 pivotally coupled to the support bracket 28 by pivot pin 67 and a second leg 68 spaced below the first leg 66. The rear pull link 62 further includes a hook portion 70 extending forward from the first leg 66 and opposite the second leg 68. The rear leg 22 is biased about the fourth pivot pin 38 in a clockwise direction (when viewed from the Figures) by a coil spring 41 wound about the pivot pin 38 to bias the seat assembly 10 toward the seating position. The front control link 64 is generally L-shaped and extends between a first end pivotally coupled to the lower end of the front leg 20 at the second pivot pin 30 and a second end pivotally coupled to the second leg 68 of the rear pull link 40 by a fifth pivot pin 44.

Referring to FIGS. 23-28, a stow pin 46 is fixedly secured to the lower end of the second leg 22 and actuates the linkage mechanism 60 between an extended position wherein the first end of the front control link 64 is against the first end 33 of the slot 26 and a retracted position wherein the first end of the front control link 64 is against the second end 35 of the slot 26. More specifically, the stow pin 46 engages the hook portion 70 of the rear pull link 62 as the seat assembly 10 rotates about the front and rear legs 20, 22 to pivot the rear pull link 62 about the pivot pin 67 pulling rearwardly on the front control link 64 to actuate the linkage mechanism 60 between the extended and retracted positions. Finally, a cinch cam 72 selectively locks the front leg 20 and front control link 64 against the first end 33 of the slot 26 when the seat assembly 10 is in any of the seating positions or easy entry position. The cinch cam 72 includes a first end pivotally coupled to the front leg 20 by first pivot 24 and a second distal end extending parallel to the support bracket 28. A wedge pin 74 projects perpendicularly from the support bracket 28 for engagement with the distal end of the cinch cam 72 to prevent sliding movement of the first pivot 24, and hence the front leg 20 and front control link 64, along the slot 26. A spring 76 may be coupled between the front leg 20 and the cinch cam 72 to rotatably bias the cinch cam 72 against the wedge pin 74.

Figure 18:
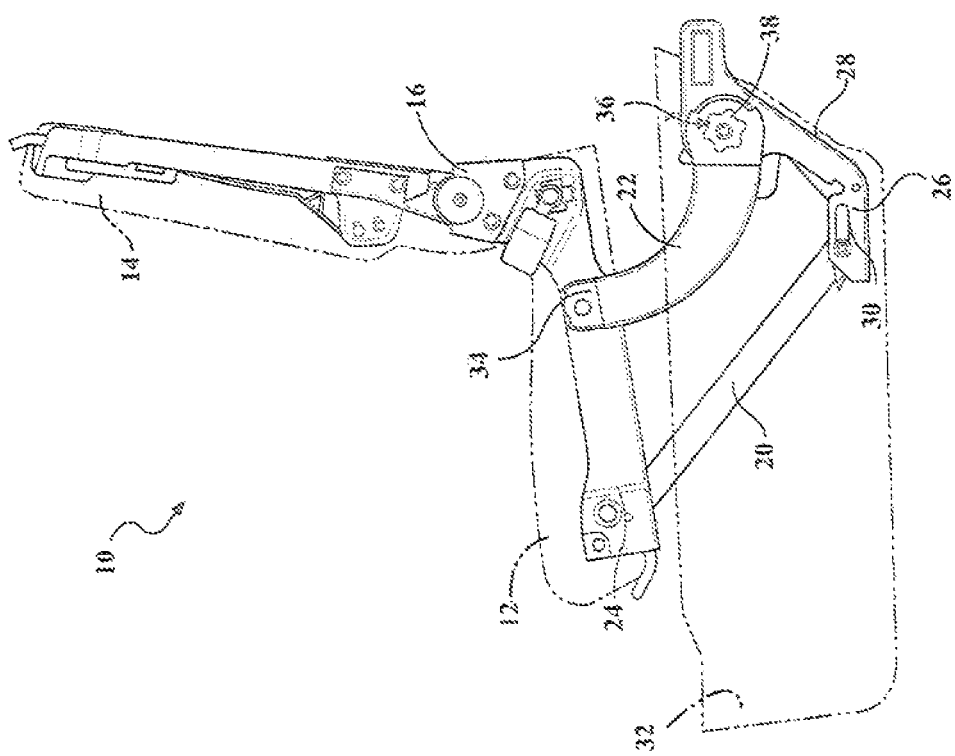
FIG. 18 is a side view of the seat assembly of FIG. 16 in a fold flat and easy entry position.

In operation, the seat assembly 10 is selectively movable between the plurality of seating positions and the easy-entry position by actuating the second recliner assembly 36 to the unlocked state to allow the front and rear legs 20, 22 to pivot forwardly or rearwardly. As the seat assembly 10 is moved between the plurality of seating positions, the stow pin 46 travels with the rear leg 22 along an arcuate path spaced from the hook portion 70 of the rear pull link 62 such that the linkage mechanism 60 is not actuated and remains in the extended position. Thus, the second pivot 30 remains at the first end 33 of the slot 26 and the front leg 20 locked in the first end 33 of the slot 26 by abutment of the cinch cam 72 against the wedge pin. When the stow pin 46 abuts rear pull link 62, the seat assembly 10 stops in the easy-entry position allowing entry and access behind the seat assembly 10. Additionally, the second pivot 30 remains at the first end 33 of the slot 26. The second recliner assembly 36 may be released to the locked state to lock and maintain the seat assembly 10 in the easy-entry position. Optionally, the first recliner assembly 16 may be actuated from the locked to unlocked state to allow the seat back 14 to pivot to the fold flat position overlying the seat cushion 12 as shown in FIG. 18.

The seat assembly 10 is selectively movable between the easy-entry position and the stow position by actuating the second recliner assembly 36 to the unlocked state to allow the front and rear legs 20, 22 to pivot forwardly or rearwardly. As the seat assembly 10 is moved from the easy-entry position toward the stow position, the cinch cam 72 rotates with the front leg 20 to release the distal end from engagement with the wedge pin 74. Additionally, the stow pin 46 engages the hook portion 70 of the rear pull link 62 causing the rear pull link 40 to rotate about the pivot 67 in a counterclockwise direction (when viewed from the Figures) pulling on the front control link 64 such that the linkage mechanism 60 is actuated from the extended position to the retracted position. Simultaneously, the second pivot 30 slides from the first end 33 to the second end 35 of the slot 26. When the second pivot 30 reaches the second end 35 of the slot 26 the seat assembly 10 is in the stow position disposed within the bin 32. It is appreciated that the seat assembly 10 may be moved from one of the plurality of seating positions to the stow position without stopping at the easy-entry position.

In order to return the seat assembly 10 from the stow position to seating position, the second recliner assembly 36 is again actuated from the locked to unlocked state and the seat cushion 12 or seat back 14 is lifted to cause the front legs 20 and rear legs 2 to pivot upwardly and rearwardly, or in the clockwise direction as shown, raising the seat assembly 10 out of the recess bin 32 to the raised seating position. The stow pin 46 seated in the hook portion 70 rotates the rear pull link 62 in the clockwise direction pushing on the front control link 64 to return the linkage mechanism 60 to the extended position and slide the second pivot 30 to the first end 33 of the slot 26 as the seat assembly 10 is moved from the stow position to the easy-entry position and then to one of the plurality of seating positions. The cinch cam 72 reengages the wedge pin 74 to retain the front leg 20 and front control link 64 against the first end 33 of the slot 26 in the seating positions.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly adapted to be mounted to floor of an automotive vehicle for selective storage within a bin recess in the floor, said seat assembly comprising:
   a seat cushion extending between a forward portion and a rearward portion;
   a seat back pivotally coupled to said rearward portion of said seat cushion for pivotal movement between an upright seating position and a fold flat position overlying said seat cushion;
   a support bracket coupled to said seat cushion and adapted for mounting said seat assembly to the floor of the vehicle;
   a pair of spaced apart front legs extending between a first end pivotally coupled to said forward portion of said seat cushion and an opposite second end pivotally coupled to said support bracket, said support bracket including a slot therein extending longitudinally between a first end and an opposite second end, said second end of said front leg slidably coupled to said slot by a pivot pin;
   a pair of spaced apart rear legs extending between a first end pivotally coupled to said rearward portion of said seat cushion and an opposite second end pivotally coupled to said support bracket; and
   a linkage mechanism operatively coupled between at least one of said front legs and one of said rear legs for actuating rotation of said seat assembly between a seating position spaced above the vehicle floor and a stow position recessed within the bin, said linkage mechanism including a front control link having a first end pivotally coupled to said second end of said front leg and an opposite second end and a rear pull link having a first end pivotally coupled to said support bracket and a second end pivotally coupled to said second end of said front control link, wherein said rear leg engages said rear pull link upon rotation of said rear leg to control movement of said front control link thereby actuating said linkage mechanism between an extended position supporting said seat assembly in said seating position and a retracted position allowing said seat assembly to rotate to said stow position.

2. The seat assembly as set forth in claim 1 wherein said first end of said front control link is pivotally coupled to said pivot pin, said front control link sliding said pivot pin and front leg from said first end of said slot to said second end of said slot upon actuation of said linkage mechanism from said extended position to said retracted position.

3. The seat assembly as set forth in claim 2 further including a stow pin extending from said rear leg for engagement with said rear pull link in response to rotation of said rear leg and actuating said linkage mechanism between said extended and retracted positions.

4. The seat assembly as set forth in claim 3 further including a first recliner assembly operatively coupled between said seat back and said seat cushion for actuation between a locked condition and an unlocked condition allowing pivotal movement of said seat back relative to said seat cushion between said upright seating position and said fold flat position.

5. The seat assembly as set forth in claim 4 further including a second recliner assembly operatively coupled between said second end of said rear leg and said support bracket for actuation between a locked condition and an unlocked condition allowing rotation of said rear legs and said seat assembly between said seating position and said stow position.

6. The seat assembly as set forth in claim 5 wherein said rear pull link includes a first end pivotally coupled to said rear leg and an opposite second end pivotally coupled to said front control link.

7. The seat assembly as set forth in claim 6 wherein said rear pull link includes a relief formed in said first end extending arcuately between a first end and a second end for receiving said stow pin therebetween, said stow pin engaging said first end upon rotation of said rear leg to actuate said linkage mechanism between said extended and retracted positions facilitating movement of said seat assembly between said seating position and said stow position.

8. The seat assembly as set forth in claim 7 wherein said extended position of said linkage mechanism defines an over-center condition wherein said pivotal connection between said rear pull link and said front control link is spaced above said pivot pin interconnecting said front leg and said first end of said front control link.

9. The seat assembly as set forth in claim 5 wherein said rear pull link includes a first leg pivotally coupled to said support bracket and a second leg spaced from said first leg pivotally coupled to said front control link.

10. The seat assembly as set forth in claim 9 wherein said rear pull link includes a hook portion extending from said first leg, said stow pin engaging said hook portion upon rotation of said rear leg to rotate said rear pull link about said first leg and actuate said linkage mechanism between said extended position and said retracted position facilitating movement of said seat assembly between said seating position and said stow position.

11. The seat assembly as set forth in claim 10 further including a cinch cam pivotally coupled to said second end of said front leg by said pivot pin and a wedge pin projecting from said support bracket for engagement with said cinch cam to retain said front leg and said front control link against said first end of said slot with said seat assembly in said seating position.

* * * * *